US006368693B1

United States Patent
Livingstone et al.

(10) Patent No.: US 6,368,693 B1
(45) Date of Patent: Apr. 9, 2002

(54) MOUSE LAP PAD

(76) Inventors: John F. Livingstone; Jodi Livingstone, both of 2575 Hill Park Dr., San Jose, CA (US) 95124

( * ) Notice: Subject to any disclaimer, the term of this patent is extended or adjusted under 35 U.S.C. 154(b) by 0 days.

(21) Appl. No.: 09/417,142

(22) Filed: Oct. 12, 1999

(51) Int. Cl.$^7$ ................................. B32B 9/00
(52) U.S. Cl. .............. 428/64.1; 248/205.3; 248/346.01; 248/918; 345/163; 345/167; 428/40.1; 428/41.9; 428/202; 428/354
(58) Field of Search .............. 428/40.1, 41.9, 428/64.1, 202, 354; 248/346.01, 205.3, 918; 345/163, 167

(56) References Cited

U.S. PATENT DOCUMENTS 5,022,170 A  *  6/1991  House ........................ 40/358
5,919,562 A  *  7/1999  Root ......................... 428/343

* cited by examiner

Primary Examiner—Nasser Ahmad
(74) Attorney, Agent, or Firm—William W. Burns, Esq.

(57) ABSTRACT

A flexible sheet, that may be instantly molded to the contour of the leg or lap, having a tacky or adhesive undersurface for adhesion to the lap, and a tacky upper surface to hold a trackball or Easy Cat™ touch pad in place during use, or in the alternative to hold a frictional surface upon which a Mouse may be operated.

9 Claims, 3 Drawing Sheets

MOUSE LAP PAD

STATEMENT AS TO RIGHTS TO INVENTION MADE UNDER FEDERALLY SPONSORED RESEARCH AND DEVELOPMENT

None—No Federal Sponsorship

CROSS-REFERENCE TO RELATED APPLICATIONS

None

BACKGROUND OF THE INVENTION

I. Field of the Invention

The present Invention relates to pads to rest and use a computer mouse or trackball, or joystick or Easy Cat™ touch pad, or any similar computer input device. The instant Invention is comprised of a flexible pad that can instantly be fitted and adhered and secured to the curves and contours of the leg or lap of the user in a position which will reduce stress, injury, and tiredness to the hands, wrists, shoulders, and arms of the user.

II. Description of the Related Art

In order to properly describe and analyze the prior art related to the present Invention, one must first understand the operational parameters of a Mouse or trackball, or a joystick, or the Easy Cat™ computer input device the devices for which the prior art and the present Invention is designed to implement.

A keyboard is ideal for entering long sequences of text or instruction, but it is poor for designating selections. Thus, PC designers developed a pointing device that could easily make selections. This paved the way for graphics-based operating systems like Window. The device was named the Mouse.

A Mouse has four major parts: the plastic housing, the mouse ball, the electronic PC board, and the signal cable. The housing assembly will vary a little depending on the manufacturer and vintage of the particular mouse, but the overall scheme is always identical. The mouse ball is a hard rubber ball situated inside the mouse body just below a small PC board. When the Mouse is positioned on a desktop, with the ball in contact with the desk surface, the ball contacts two (2) actuators that register the mouse ball's movement in the x (left-to-right) and y (up-and-down) directions. Each of the two sensors generates a series of pulses which represents movement in one of the two axes. Pulses equals to mouse movement—more pulses mean more movement. The pulses from both axes are amplified by the PC board and sent back to the computer along with information on the condition of each mouse button. Thus, to adjust the pointers, the Mouse requires a surface upon which it can be moved with the mouse ball in contact with that surface.

The trackball is basically an inverted mouse. Instead of using your hand to move a mouse body around on a desk surface, your hand or fingertips move the ball itself, which is mounted through the top of the device; the trackball unit remains stationary. And similarly, the joystick housing is also held stationary during use. The Easy Cat™ touch pad replaces the ball of the trackball with the users finger moving over a flat surface. Movement of the finger results in corresponding movement of a pointer on a computer screen. The touch pad remains stationary during use.

The related prior art includes numerous designs for the use of a Mouse. Those designs which appear to be most pertinent here are: U.S. Pat. No. 5,738,325, which describes a flat mouse pad utilizing a light tack adhesive on its underside to hold the pad in position on a computer table or desk; U.S. Pat. No. 5,820,968, presents a laminated pad, which is deformable such that it can be bent to a shape, such as the edge of a desk, that it will retain. The lower surface of this pad is constructed of a non-skid material such as polyurethane. U.S. Pat. Nos. 5,340,075 and 5,492,298 present ergonomic mouse pads. Each of these pads exhibit an inclined surface for movement of a mouse; and U.S. Pat. No. 5,779,211, which describes a portable mouse pad, is attached to the user's leg by means of an elastic strap and U.S. Pat. No. 5,765,790, which presents a box-shaped Mouse pad with a concave bottom for placement on the user's leg.

The improvements embodied in the present invention, address user comfort and health. The ergonomic pad in the present Invention is contoured to the body to allow a comfortable, relaxed position of the hand, wrist, or arm as the Mouse, trackball, or joystick or Easy Cat™ is used.

The problem that the present invention is designed to overcome has become acute. The United States Bureau of Labor Statistics listed 276,000 repeated trauma injuries, which includes Mouse injuries, keyboard injuries, and assembly injuries.

With increased use of the Mouse or trackball with the Internet, it is expected that such injuries will rise. Persons who suffer carpal tunnel syndrome and other repetitive motion injuries to the hands, wrists, and arms can't shake hands, can't write, can't pickup their children, and can't drive.

SUMMARY OF THE INVENTION

The Lap Mouse or trackball pad of the present invention consists of a thin, elliptical shaped elastic, plastic pad that has a tacky or adhesive underside which allows the pad to be adhered to the legs or lap of the user. For use with a trackball, the pad has a non-skid or tacky upper surface. With a trackball as an input device, the user simply shapes and adheres the pad to the knee or lap, places the trackball unit in contact with the non-skid upper surface and the trackball is in use. The joystick or Easy Cat™ would be utilized in similar fashion.

If the input device for the computer is a Mouse, a second elastic or plastic sheet would first be adhered to the upper tacky surface of the lap pad. This sheet has an upper surface that allows frictional contact of the ball and full range of movement of the Mouse over the surface of the sheet. The Mouse would have full range of movement on the upper surface of the second sheet.

There has thus been outlined rather broadly the important features of the present Invention in order that the detailed description thereof that follows may be better understood and in order that the present Invention may be better appreciated. There are, of course, additional features of the Invention that will be described hereinafter plus other embodiments, all of which form the subject matter of the Claims appended hereto. Those skilled in the Art will appreciate that the concept, upon which this disclosure is based, may be readily utilized as a basis for designing of other structures for carrying out the several purposes of the present invention. It is important therefore, that the Claims be regarded as including such equivalent construction so far as they do not depart from the spirit and scope of the present Invention.

As such it is an object of the present invention to provide a new and improved pad or implement for the use of a trackball, Mouse, joystick or Easy Cat™, which has all of the advantages of the Prior Art pads or implements, and methods and none of the disadvantages.

It is another object of the present Invention to provide a new and improved pad or implement which may be efficiently and easily manufactured, marketed, and installed, and the components of which are easily transported to the far corners of the World. And it is a further object that the present Invention my be simply and reliably made with minimum labor costs.

It is a still further object of the present Invention that the lap pad may be put to use quickly and easily thus saving time and effort.

An even further and important object of the present Invention is that the lap pad may be quickly and reliably positioned to reduce hand, wrist, and arm strain.

These together with other objects of the invention along with the various features of novelty which characterize the Invention, are pointed out with particularity in the Claims annexed to and forming a part of this Disclosure. For a better understanding of the Invention, its operating advantages, and the specific objects attained by its uses, reference should be had to the accompanying drawings, and descriptive matter in which there is illustrated preferred embodiment of the Invention.

DESCRIPTION OF THE PREFERRED EMBODIMENT

The instant Invention presents a solution to arm, wrist and shoulder strain and tension that can be caused by use of a trackball, Mouse, joystick, or other input device for the computer monitor screen pointer on desks or other elevated surfaces. The present Invention allows the user to use his input device in a comfortable position on his lap or leg. The input device would be rested and used upon the lap pad of the instant Invention. Perhaps the greatest benefits of the present Invention are its simplicity, its ease of use, and its speed of use.

Figure 1:
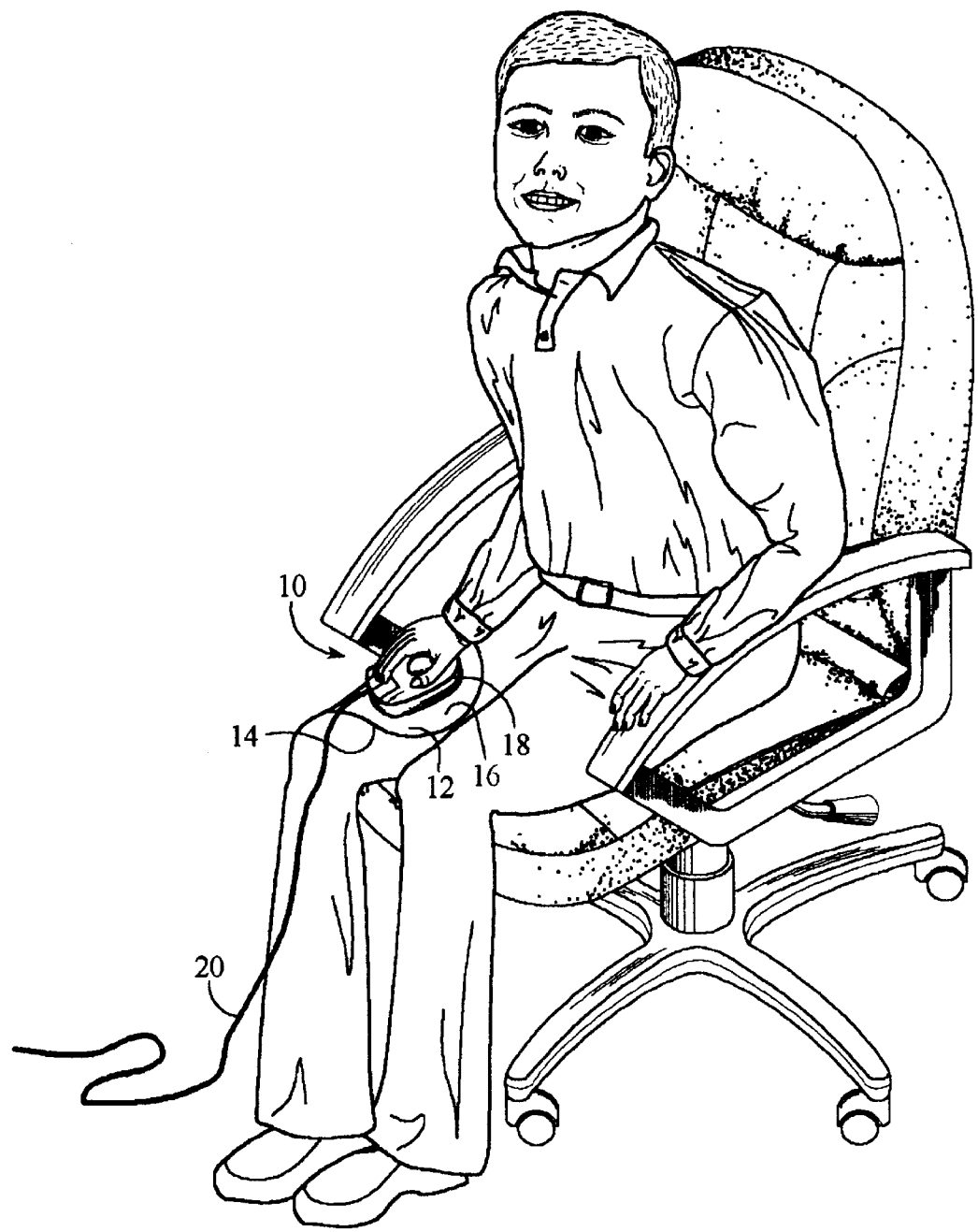
FIG. 1. A perspective drawing of the lap pad of the present Invention with a trackball input device in operation.

In the preferred embodiment 10 which is depicted in FIG. 1, the lap pad or implement of the present Invention is comprised of a fully flexible, thin sheet of rubber or plastic 12. Other flexible materials, such as cloth, may be used, but plastic or rubber is preferred. In the preferred embodiment as shown, the pad 12 has assumed a circular or elliptical shape, however, other shapes such as squares or rectangles can also be used. The underside 14 of the pad or implement 12 in the preferred embodiment will have a sticky surface which will adhere to the clothing of the user. The sticky surface can be a tacky plastic or rubber material or the sticky surface can be created by a light pressure-sensitive adhesive that can be sprayed on or applied by other means. Pressure-sensitive adhesives are materials which in dry form are aggressively and permanently tacky at room temperature and firmly adhere to a variety of dissimilar surfaces upon mere contact without the need of more than finger or hard pressure. There are numerous adhesive systems that can be used including but not limited to rubber based acrylics or silicones.

The upper surface 16 of the pad 12 of the preferred embodiment is also tacky or sticky such that an object such as a trackball placed upon the surface will remain stationary while it is operated.

Use of the lap 12 of the present Invention is extremely simple. The operator simply adheres or attaches the pad 12 to the leg or lap as shown in FIG. 1. A trackball input device 18, which is attached to the computer by cable 20, is placed in secure contact with the tacky or sticky upper surface 16 of the pad 12. The operator with arm in a relaxed position commences use of the trackball. The use of the lap pad 12 for a joystick would be similar.

Figure 2:
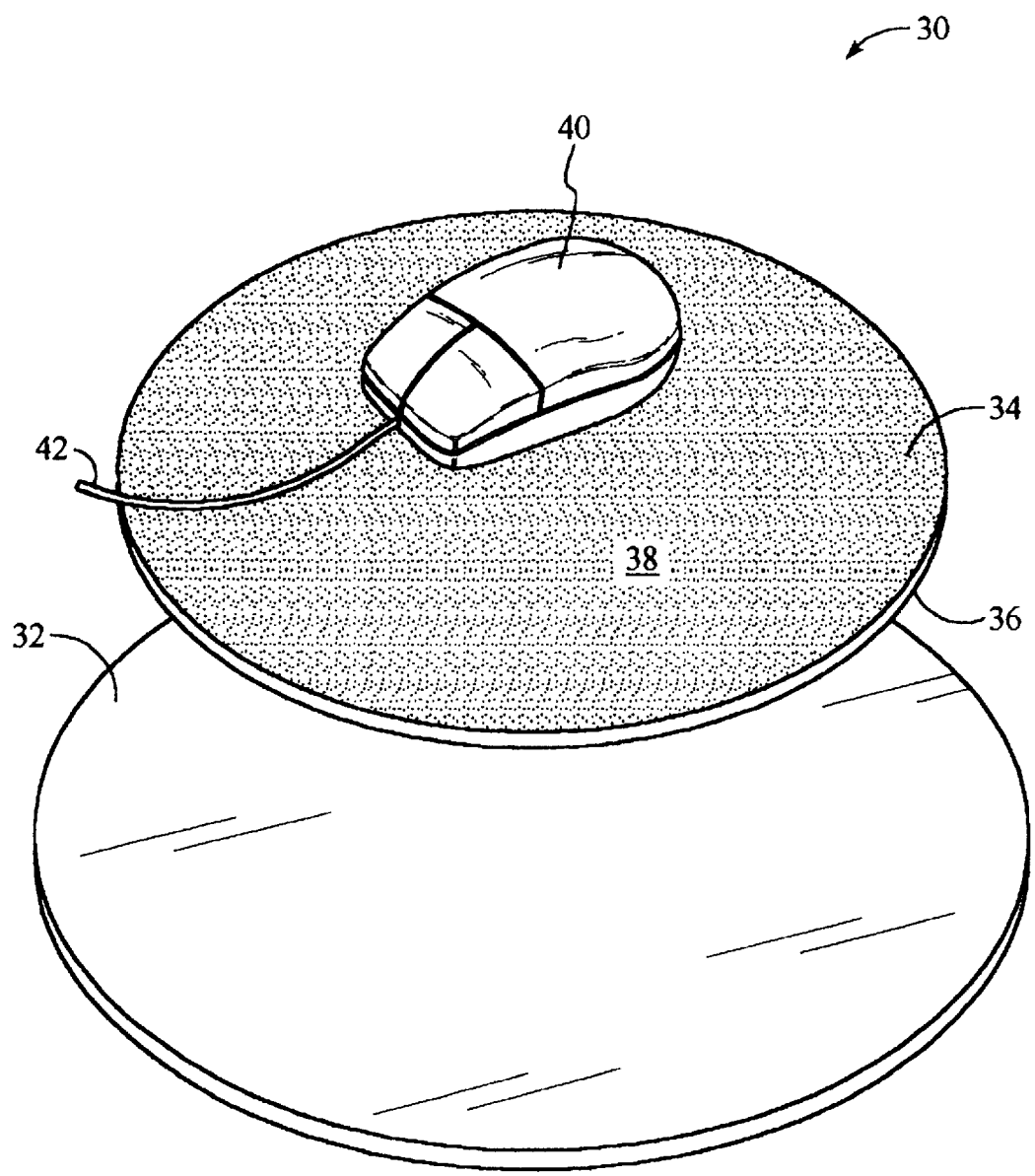
FIG. 2. An exploded perspective view of the second embodiment displaying the two (2) sheets of the second embodiment and also displaying the tacky upper surface of the bottom sheet.
Figure 3:
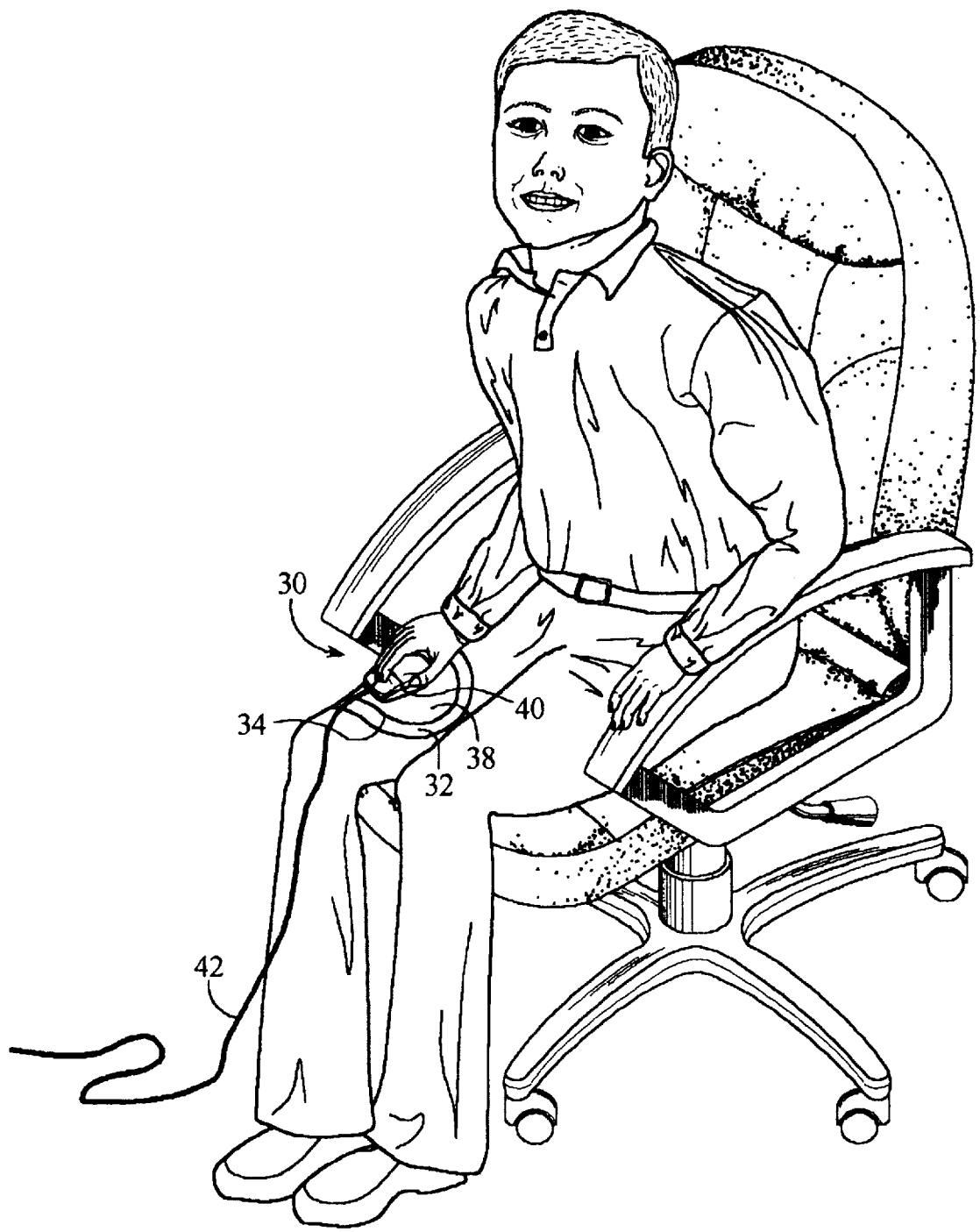
FIG. 3. A perspective drawing of the second embodiment displaying the first and second sheets and a Mouse in operation.

In a second embodiment 30 of the present Invention as displayed in FIGS. 2 and 3, the lap pad comprises a first flexible, thin, plastic or rubber sheet 32 which can be flexed to the contour of the user's leg or lap, and a second flexible, thin, plastic or rubber sheet 34. The first sheet 32 is basically equivalent to the pad described in the preferred embodiment having a sticky or tacky upper surface and tacky or adhesive undersurface which will adhere to the clothing of the operator. The first sheet can be of any convenient configuration: square, rectangle, ellipse, or other. In this case, a circular pattern is chosen. The second sheet 34, has a tacky or adhesive underside 36 and a textured or smooth upper surface 38 which will provide frictional contact with the ball of a Mouse. To use the lap pad of the second embodiment there are two (2) options. In the first option, the second sheet 34 is permanently adhered by means of adhesive to the upper surface of the first sheet 32. The combination of the two sheets is flexed to the contours of the leg or lap of the user. A Mouse input device 40, as displayed in FIG. 2, which is attached to the computer by wire 42, is placed in contact with the upper surface of the second sheet and the user commences operation. In a second option, the tacky underside of the second sheet would temporarily adhere to the tacky upper surface of the first sheet and be usable with the first sheet alone for use with a trackball or with the first and second sheets for a Mouse.

While the Invention has been described with reference to the specific embodiment described, those descriptions are only illustrative and are not to be construed as limiting the Invention. With respect to the above descriptions, then, it is to be realized that the optimal dimensional relationships for the parts of the Invention include variations in size, materials, shape, configurations, form, function, and manner of operations assembly and use, are deemed readily apparent and obvious to those skilled in the art and all equivalent relationships to those illustrated in the drawings and described in the specifications are intended to be encompassed by the present Invention.

Therefore, the foregoing is considered as illustrative only of the principles of the Invention. Further, since numerous modifications and changes will readily occur to those skilled in the art, it is not desired to limit the Invention to the exact construction and operation shown and described and accordingly, all suitable modifications and equivalents may be resorted to falling within the scope of the Invention.

What is claimed as being new and desired to be protected by letters Patent of the United States is as follows:

1. An implement upon which to operate a computer input device, the implement comprising: a sheet of fully flexible, elastic material having a tacky underside to grip the contours and curvatures of the user's leg or lap in order to reduce strain and stress injuries in a computer operator's arm, and a tacky upper side.

2. The implement of claim 1 wherein the input device is a trackball, joystick or touch pad that is held in place for use by the tacky upper side of the elastic material on the leg or lap allowing the user's arm to work in a relaxed position.

3. The implement of claim 1 wherein a second flexible, elastic sheet, having a textured upper surface, is adhered with its lower surface in contact with the tacky upper side of the implement, and a mouse is movably operated over the textured surface allowing the user's arm to work in a relaxed position.

4. The implement of claim 1 wherein the elastic material is a flexible plastic.

5. The implement of claim 1 wherein the tacky under-side comprises a light adhesive.

6. The implement of claim 1 wherein the tacky upper side comprises a light adhesive.

7. The implement of claim 1 wherein the sheet has a circular shape.

8. The method of using a flexible implement, having tacky upper and lower surfaces, on a computer operator's leg or lap in order to reduce stress and strain in the operator's arm comprising the steps of:

(a) bending the implement to conform to the contours and curves of the operator's leg or lap;

(b) adhering the lower surface of the implement to the contours and curves of the operator's leg or lap;

(c) placing a trackball or touch pad on the upper tacky surface of the implement; and (d) operating the trackball or touchpad with the arm in a relaxed position to reduce stress and strain.

9. The method of using a flexible implement having a tacky lower surface and a textured upper surface on a computer operator's leg or lap in order to reduce stress and strain in the operator's arm comprising the steps of:

(a) bending the implement to conform to the contours and curves of the operator's leg or lap;

(b) adhering the lower surface of the implement to the contours and curves of the operator's leg or lap;

(c) placing a mouse on the upper textured surface of the implement with the ball of the mouse in contact with the textured surface; and (d) movably operating the mouse with the arm in a relaxed position, to reduce stress and strain, over the texture surface.

* * * * *